Aug. 25, 1959 H. WINET 2,901,212
VALVE UNIT FOR GAS OVEN TEMPERATURE REGULATOR
Original Filed Oct. 2, 1951
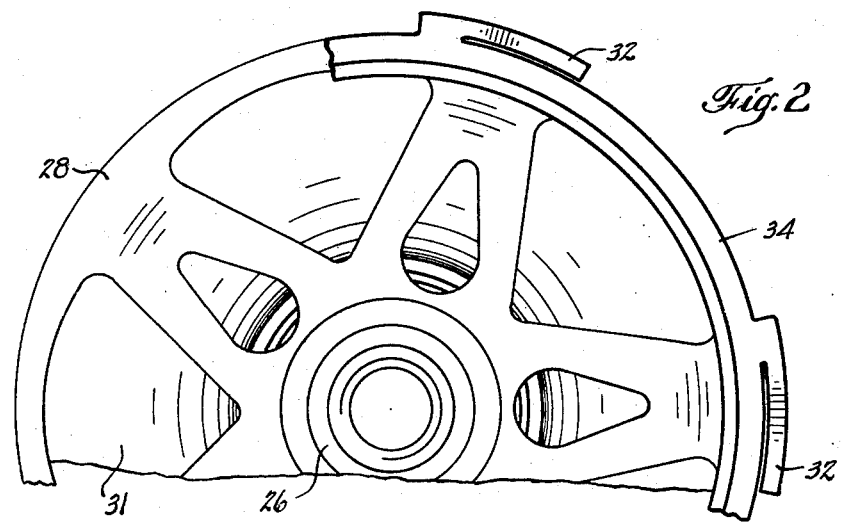
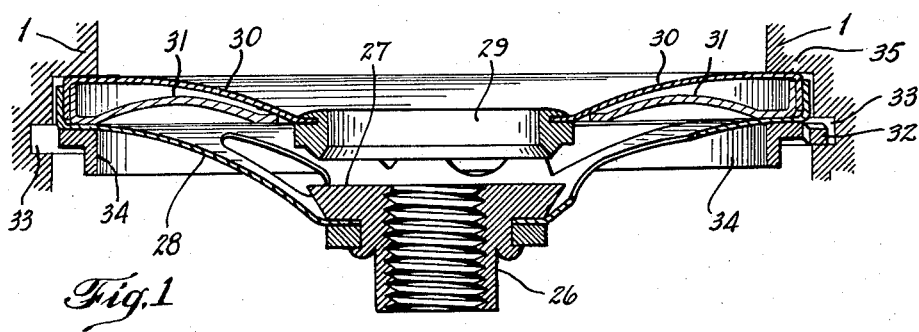
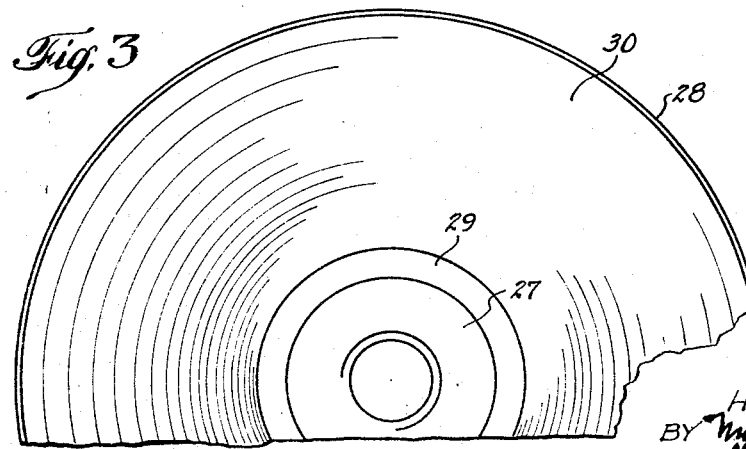
INVENTOR:
HANS WINET
BY
ATTORNEYS

United States Patent Office 2,901,212
Patented Aug. 25, 1959

2,901,212

VALVE UNIT FOR GAS OVEN TEMPERATURE REGULATOR

Hans Winet, Zurich-Wollishofen, Switzerland, assignor to Landis & Gyr, A.G., a body corporate of Switzerland Original application October 2, 1951, Serial No. 249,273, now Patent No. 2,726,041, dated December 6, 1955. Divided and this application February 2, 1954, Serial No. 408,523

Claims priority, application Switzerland July 9, 1951

2 Claims. (Cl. 251—333)

The present invention relates to a novel and improved valve and seat unit for controlling the flow of fluid, and especially for the control of gaseous fluids, i.e. gases.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The subject matter of this application is illustrated and described in my copending application Serial No. 249,273, filed October 2, 1951, now Patent No. 2,726,041, patented December 6, 1955, but the claims relating to the subject matter of the present application have been cancelled therefrom under a requirement for division.

The present invention has for its object the provision of a novel and improved gas oven temperature regulator of simplified construction which is entirely reliable in operation. A further object is the provision of a gas oven temperature regulator having a regulator valve which forms a constructional unit and can be mounted and replaced as a whole. A further object is the provision of a regulator valve unit which is exceedingly compact, has a small number of parts which are not readily dearranged and is adapted to be mounted directly on an adjusting spindle actuated by the thermally responsive element of the thermostat.

The present invention provides a temperature regulator of improved construction for gas baking ovens, the regulator being provided with a temperature responsive diaphragm which acts directly on a valve spindle on which is threadedly mounted a valve unit. The valve unit comprises a sleeve threaded to receive the spindle and a coaxial ring adapted to be moved toward and away from a part of the sleeve which forms the valve seat, the sleeve and ring being interconnected by means of a pair of valve discs, one of which is formed as a disc spring so that the valve parts have relative resilient movement with respect to each other under control of the threaded spindle, as the temperature responsive diaphragm is moved and the outer edges of the valve discs are held against movement. At their outer edges the valve discs are provided with means for securely anchoring the valve unit in the regulator body so that the discs are also held against rotational movement as the threaded member is turned to change the temperature setting of the regulator.

The present invention is in many respects an improvement on the gas oven temperature regulator disclosed in the prior application of Hans Winet and Albert Kaser, Serial Number 223,493, filed April 28, 1951, but in other respects the invention is of more general application.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

Of the drawings:

Fig. 1 is a cross-sectional view of a valve and seat constructed in accordance with the teachings of the invention;

Figure 2 is a fragmentary bottom plan view of the valve shown in Figure 1; and

Figure 3 is a top plan view of the valve shown in Figures 1 and 2.

The valve unit is adapted to be mounted on and moved by a threaded spindle and comprises a sleeve nut 26, internally threaded to fit a spindle. The face of the sleeve nut 26 is formed as a flat valve head 27 and is adapted to cooperate with a valve seat 29, the seat 29 having a relatively sharp edge adjacent to the valve head 27 and adapted to contact therewith to close the passageway for gas which is controlled by the relative movement of the valve head 27 and the seat 29. Valve head 27 and the valve seat 29 are mounted with respect to each other by means of slotted spring disc 28 fixed to the sleeve nut 26, and a solid disc 30 fixed to the valve seat 29. The sleeve nut 26, valve seat 29, slotted spring disc 28 and the solid disc 30 are all coaxial with each other and normally spaced apart, and the slotting of the disc 28 not only provides for the flow of gas through this disc, but also makes the disc 28 relatively weaker as a spring than the solid disc 30, while the internal diameter of the valve seat 29 is considerably larger than the exterior diameter of the threaded spindle for the nut 26.

At their outer edges discs 28 and 30 are bent over towards each other and are fitted into each other so that relative movement of the discs at their edges is prevented, and relative movement between the valve parts 26 and 29 is thus provided for by the resiliency of the slotted spring disc 28. Between the disc spring 28 and the relatively stiff disc 30 is provided a stop disc 31 having its outer edge bent over and secured by friction against the bent-over edges of the discs 28 and 30, while the inner edge of the stop disc is formed as a circular aperture, coaxial with the discs 28 and 30 and is so positioned to limit movement of the valve seat 29 towards the valve head 27 on the spindle nut 26, while permitting some movement of the valve seat in the opposite direction in case valve head 27 is pressed too hard against the valve seat 29. Thus, any additional movement of the activation force in a passageway closing direction after the valve is closed merely moves both the valve seat 29 and valve head 27 a slight distance without opening the valve or deforming and damaging the structure. Ordinarily this might happen when the collateral structure is not properly adjusted or when the control is turned to a lower temperature while the oven is still hot.

On the valve unit is a guard ring 34 having resilient arcuate wings 32 spaced around its outer edge which are adapted to engage in a groove 33 formed in the housing 1 adjacent the circular seat in which the valve unit as a whole is mounted, the wings serving to press the valve unit against the shoulder 35 of the circular seat to form a gas tight joint therewith.

Figure 1 of the drawings shows the valve unit in its relaxed position, with spring disc 28 urging the valve head 27 away from the valve seat 29 so as to permit passage of gas through the space between the parts 27 and 29, and with the disc spring 28 unstressed by the spindle. As the spindle for the nut 26 is turned to a lower temperature position, spindle nut 26 forces the valve head 27 against the valve seat 29 against the action of spring disc 28 so as to close or reduce the passageway between the valve parts 27 and 29. The discs 28 and 30 are preferably both flared or bell-shaped in the same direction.

During operation, the expansible liquid in a heat-responsive bulb, exposed to the temperature of the oven, causes displacement of the spindle threaded in the nut 26. Such movement is transmitted to the sleeve nut 26 and the valve head, against the pressure of the spring disc 28, to cause the valve head to move towards or away from the valve seat 29, thereby regulating the flow of gas through the valve head, this flow of gas passing through the space between the valve parts 27 and 29. As the temperature of the bulb increases, the flow of gas is diminished, and a reduction in the temperature causes an increase in the flow of gas to the oven.

The invention in its broader aspects is not limited to the specific mechanisms shown and described but departures may be made therefrom within the scope of the accompanying claims without departing from the principles of the invention and without sacrificing its chief advantages.

What is claimed is:

1. In a valve unit for a temperature regulator for gas-heated ovens the combination of a pair of dished disc-linked springs mounted at a spaced distance one above the other, one of said springs being centrally apertured for the passage of gas, the other of said springs being perforated other than at its center for the passage of gas and being weaker than said one spring, a valve head supported centrally of the perforated spring and a cooperating valve seat adjacent to the aperture in said one spring, said valve head being variably movable toward the valve seat to control the flow of gas through the centrally apertured spring, and a centrally apertured relatively stiff disc positioned between the two aforesaid springs to limit movement of the valve seat in one direction.

2. A valve unit as claimed in claim 1 in which the centrally apertured relatively stiff disc limits movement of the valve seat toward the valve head.

References Cited in the file of this patent

UNITED STATES PATENTS

| | | |
|---|---|---|
| 249,612 | Grinnell | Nov. 15, 1881 |
| 1,497,275 | Hench | June 10, 1924 |
| 1,897,155 | Vaughn | Feb. 14, 1933 |
| 1,910,961 | Perry | May 23, 1933 |